US008194072B2

(12) United States Patent
Jones et al.

(10) Patent No.: US 8,194,072 B2
(45) Date of Patent: Jun. 5, 2012

(54) METHOD FOR SYNTHETICALLY RELIGHTING IMAGES OF OBJECTS

(75) Inventors: Michael J. Jones, Belmont, MA (US); Tim Marks, Newton, MA (US); Ritwik Kumar, Gainesville, FL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 72 days.

(21) Appl. No.: 12/732,335

(22) Filed: Mar. 26, 2010

(65) Prior Publication Data
US 2011/0234590 A1  Sep. 29, 2011

(51) Int. Cl.
*G06T 15/50* (2011.01)
*G06K 9/00* (2006.01)

(52) U.S. Cl. ........................ 345/426; 382/118
(58) Field of Classification Search .............. 345/426; 382/115, 117, 119, 190
See application file for complete search history.

(56) References Cited

U.S. PATENT DOCUMENTS

| | | | | |
|---|---|---|---|---|
| 7,295,716 | B1* | 11/2007 | Chinen et al. ................ 382/274 |
| 7,379,071 | B2* | 5/2008 | Liu et al. ..................... 345/582 |
| 2001/0031073 | A1* | 10/2001 | Tajima ......................... 382/118 |
| 2001/0033685 | A1* | 10/2001 | Ishiyama ...................... 382/154 |
| 2003/0053664 | A1* | 3/2003 | Pavlidis et al. .............. 382/117 |
| 2003/0066949 | A1* | 4/2003 | Mueller et al. ............ 250/208.1 |
| 2003/0123713 | A1* | 7/2003 | Geng ........................... 382/118 |
| 2004/0223631 | A1* | 11/2004 | Waupotitsch et al. ........ 382/118 |
| 2006/0104488 | A1* | 5/2006 | Bazakos et al. .............. 382/118 |
| 2006/0182367 | A1* | 8/2006 | Moghaddam ................ 382/276 |
| 2006/0280342 | A1* | 12/2006 | Lee et al. ..................... 382/118 |
| 2006/0280343 | A1* | 12/2006 | Lee et al. ..................... 382/118 |
| 2009/0226029 | A1* | 9/2009 | Shimano et al. ............. 382/100 |
| 2009/0238449 | A1* | 9/2009 | Zhang et al. ................. 382/165 |
| 2009/0310828 | A1* | 12/2009 | Kakadiaris et al. .......... 382/118 |
| 2010/0172560 | A1* | 7/2010 | Kimmlingen et al. ....... 382/131 |
| 2010/0185064 | A1* | 7/2010 | Bandic et al. ............... 600/306 |

OTHER PUBLICATIONS

Debevec et al.; Acquiring the Reflectance Field of a Human Face; SIGGRAPH Conference; 2000.*
Barmpoutis et al.; Beyond the Lambertian Assumption: A generative model for Apparent BRDF fields of Faces using Anti-Symmetric Tensor Splines; Computer Vision and Pattern Recognition; pp. 1-6; Aug. 2008.*
Kumar; Relighting, Pose Change and Recognition of Faces; Univeristy of Florida; 2009.*

* cited by examiner

*Primary Examiner* — David T Welch
(74) *Attorney, Agent, or Firm* — Dirk Brinkman; Gene Vinokur (57) ABSTRACT

An image of an object from a known object class is synthesized by first obtaining reflectance fields for various training objects from the object class. A reflectance field model is defined for the object class using a combination of the reflectance fields of the training objects. The parameters of the reflectance field model are optimized to estimate a particular reflectance field of a particular object from the object class given one or more input images of the particular object. The particular reflectance field is fitted to the particular object, and then the new image of the particular object is synthesized by changing the illumination parameters of the particular fitted reflectance field model after the fitting.

28 Claims, 4 Drawing Sheets

Input: *IllumTrainSet* of $N_l$ subjects with $k$ ($\geq 9$) directionally lit images each; *TexTrainSet* of $N_t$ texture images; Reference Face $F_r$

Output: Mean Texture Image $\overline{\mathcal{T}}$, Eigen-Texture Images $\hat{t}_j$, Mean Illumination Field $\overline{\mathcal{L}}$, Eigen-Illumination Fields $\hat{l}_i$ 1 foreach *Subject* $s \in$ *IllumTrainSet* do
2     Non-rigidly warp the $k$ images to $F_r$
3     From the warped images, compute Tensor Splines representation $\Gamma_s = \{\gamma_{klm}\}$ at all pixels (Eq. 2)
4     Compute the illumination field
        $\mathcal{L}_s$ = vectorize($\Gamma_s$/frontally lit image of $s$)
5 foreach *Image* $T_t \in$ *TexTrainSet* do
6     Non-rigidly warp $T_t$ to $F_r$
7     $\mathcal{T}_t$ = vectorize (warped $T_t$)
8 $\overline{\mathcal{T}} = (1/N_t) \sum_t \mathcal{T}_t, \quad \overline{\mathcal{L}} = (1/N_l) \sum_s \mathcal{L}_s$
9 $\hat{l}_i$ = Eigenvectors($\sum_s (\mathcal{L}_s - \overline{\mathcal{L}})(\mathcal{L}_s - \overline{\mathcal{L}})^T/N_l$)
10 $\hat{t}_j$ = Eigenvectors($\sum_t (\mathcal{T}_t - \overline{\mathcal{T}})(\mathcal{T}_t - \overline{\mathcal{T}})^T/N_t$)

*Fig. 3*

Input: $K$ input images, $I_k$, where image $I_{k^*}$ is lit from roughly frontal direction $(\theta_{k^*}, \phi_{k^*})$; MoRF Model $\{\hat{t}_j, \overline{\mathcal{T}}, \hat{l}_i, \overline{\mathcal{L}}\}$; Reference Face $F_r$

Output: Reflectance field $R$ for input subject

1. Non-rigidly warp $I_k$ to $F_r$
2. Optimize Eq. 5 to obtain parameters $\alpha_i, \beta_j, \theta_k, \phi_k$
3. $\hat{R}(x,y) = \left(\sum_i \alpha_i \hat{l}_i + \overline{\mathcal{L}}\right)(x,y) \cdot \left(\sum_j \beta_j \hat{t}_j + \overline{\mathcal{T}}\right)(x,y)$ as in Eq. 1.
4. Inverse warp $\hat{R}$ to obtain $R$
5. $I_f$ = sample of $R$ in $(\theta_{k^*}, \phi_{k^*})$ direction
6. $R = R/I_f \times I_{k^*}$

*Fig. 4*

METHOD FOR SYNTHETICALLY RELIGHTING IMAGES OF OBJECTS

FIELD OF THE INVENTION

This invention relates generally to processing images, and more particularly to relighting images of objects from a known object class, such as faces, in images that have been acquired by a camera or synthetically generated.

BACKGROUND OF THE INVENTION

In many computer graphics, computer animation, computer vision, robotics, virtual reality, and visual effects applications, it is frequently necessary to relight images of objects from a known object class. The images can be acquired by a real camera, or the images can be synthetically generated by a virtual camera, e.g., in computer graphics and animation. An object class refers to a set of objects that are similar in shape and appearance such as human faces, bodies, cars, metal screws, etc.

Methods are known for recognizing objects within an object class, such as identifying particular faces or people in images. The methods typically compare an image of an unknown object from the class to images of known objects from the class in a database. As defined herein, a gallery of images refers to the set of images of the known objects from the class that is stored in the database, and a probe image refers to the image of the unknown object from the class. Determining whether two images are of the same object is an especially difficult problem when the images are taken under very different illuminations. This is a particularly difficult problem for face recognition systems.

There are three main approaches to deal with this problem of varying illumination. The first approach is based on constructing a classifier that uses illumination-invariant image features. The second approach normalizes the images in an attempt to explicitly reduce or remove the effects of varying illumination. Techniques from the second approach either assume a reflectance model and attempt to remove the effects of light, or adopt an image processing approach in which various steps are empirically chosen to provide desired output. The third approach attempts to generate synthetic relit images that generalize from a given gallery of images to match a wide range of possible illumination variations in probe images. The synthetic images are added to the gallery to produce an augmented database. It is expected that each probe image will find a close match to at least one of the images in the augmented gallery. Although this third approach can be effective at generating good quality relit images, the prior art relighting methods suffer from the requirements of manual initialization and cumbersome optimization, which reduce their attractiveness for face recognition and other applications that require fast performance or have a large gallery.

SUMMARY OF THE INVENTION

This invention describes a method of using a set of reflectance fields of multiple objects from an object class, such as human faces, which we call training reflectance fields, and then estimating the reflectance field of a new image (or set of images) of an object from the object class by fitting a combination of the training reflectance fields. The fitted reflectance field can then be used to synthesize new images of the object under different illuminations.

DETAILED DESCRIPTION OF THE PREFERRED EMBODIMENTS

The embodiments of our invention provide a method for synthesizing images of an object from an object class to appear to have varying illumination. The steps of the method as described herein can be performed in a processor including memory and input/output interfaces. In general, the processor manipulates pixels in the images to synthesize images with varying illumination.

An object class is a set of objects whose appearance is similar but not identical. Examples include human faces, hearts or other organs, automobiles, similar machine parts, or CAD (computer-aided-design) models of numerous instances of a class of objects. The only requirement is that the instances of the object class have similar shapes and textures. In one example application, the objects are human faces. Since any two faces are much more similar to each other than either of them is to a random non-face object, we may assert that all faces have similar shapes and textures. However, lighting variations can cause large differences in the appearance of a face. One object of our invention is to synthesize images of any face so that the images vary in illumination and mimic the effects of natural variations in lighting.

Although the invention is described in terms of synthesizing face images for the purpose of face recognition, it is understood that the method can be applied to other object classes and other applications.

Reflectance Fields

We begin by describing our reflectance field model. A reflectance field is an 8-dimensional function of a 4D incident light field arriving at a surface of an object and the 4D radiant light field reflected by the surface. We assume distant point light sources and a frontal view. Thus, we only consider a 4D slice of the conventional reflectance field. This 4D reflectance field has two dimensions (x, y) for the surface coordinates of the radiant light, and two angles ($\theta$, $\phi$) for the direction of the incident light.

Whereas the prior art has defined the surface coordinates to be a 2D parameterization of the 3D points on the surface, we model the surface of an object as a 2D plane. Thus, our surface coordinates correspond exactly to 2D image coordinates. For convenience, we define the output of the reflectance field as a brightness value rather than the conventional radiance value.

Herein, we use the term reflectance field to denote this 4D function whose inputs are image coordinates (x, y) and direction of the incident light ($\theta$, $\phi$) and whose output is a brightness value.

We use the term reflectance function to refer to the 2D spherical function obtained by restricting the reflectance field to a fixed location (pixel) in an image. Hence, herein, the reflectance field is a 2D field of reflectance functions, one for each pixel.

In these definitions of reflectance field and reflectance function, the incident light is modeled as a single point light source. However, our method is more general than this and can be used for arbitrary illumination conditions, including those with multiple light sources and non-point light sources. In such cases, the illumination condition may be represented using a different parameterization than ($\theta$, $\phi$) which may have more than two dimensions. Parameterizing the illumination condition with more than two dimensions would cause the reflectance field to have greater than four dimensions of input and the reflectance function to have greater than two dimensions of input.

Example Application: Augmented Gallery

Figure 1:
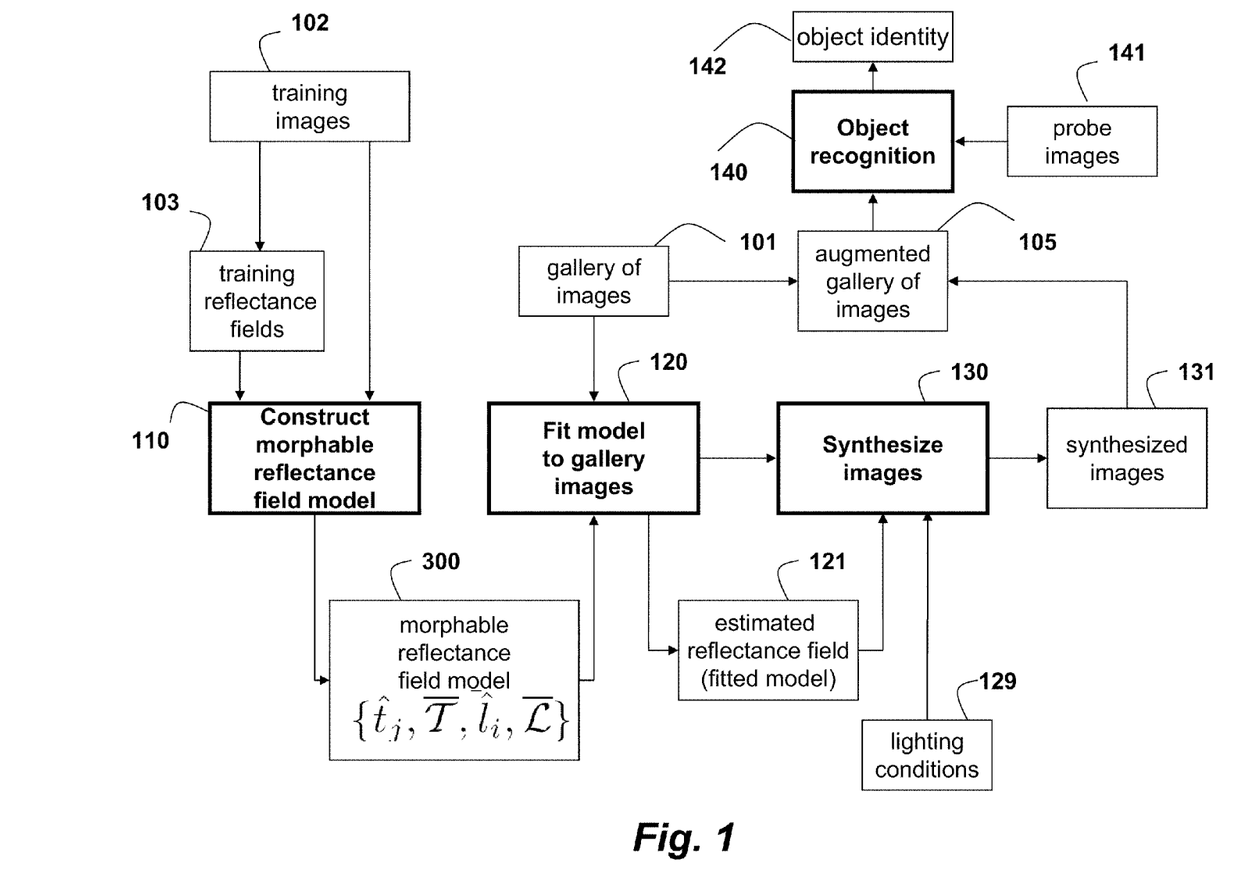
FIG. 1 is a flow diagram of a method for augmenting a gallery of images of faces used for face recognition with synthetic images having varying illumination according to embodiments of the invention.

As shown in FIG. 1, our method for object recognition 140 by augmenting a gallery 101 of images of objects from an object class includes the following major parts.

First we construct 110 a morphable reflectance field model 300 of an object class, such as faces, using training images 102. From the training images, we obtain training reflectance fields 103.

Then, for any selected object from the class that has images in the gallery 101 under one or more illumination conditions, we fit 120 the model 300 to the images (from the gallery 101) of the object to obtain an estimated reflectance field 121 for the object, which we then use to synthesize 130 output images 131 of the object under varying illumination conditions 129. The synthesized images can then be added to the gallery 101 to form an augmented gallery 105 of images.

The augmented gallery can be used for object recognition 140 (such as face recognition), which involves determining, for a given set of one or more probe images 141 of an object from the object class, the identity 142 of the object. This consists of determining which of the objects represented in the gallery, if any, corresponds to the probe image(s). Our method for object recognition is independent of the classifier used for the recognition, because the augmented gallery can be fed into any recognition system that uses a gallery of images of objects from an object class (such as a gallery of face images).

The first part of our method involves constructing 110 the reflectance field model 300. The model captures a sufficient amount of the variation seen in actual reflectance fields of objects in the object class, so that the model can be readily fit to images of any object from the class under various lighting conditions.

After we have the reflectance field model that is expressive enough to approximate an image of any object in the class under any illumination, we fit 120 the model 300 to input images from the gallery 101. To obtain an estimated reflectance field 121 of an object, the model is fit 120 to gallery images 101 of the object under one or more illumination conditions, as described below.

After fitting the model to an object, the illumination inputs of the fitted model may be changed to render 130 new synthetic images 131 of the object under various lighting conditions 129. The synthesized images 131 of objects in the gallery 101 may be added to the gallery to obtain an augmented gallery 105.

Our model is different from the conventional models used by prior art techniques. Although our model incorporates 3D shape information, it is fully defined by a 2D field of spherical functions. This enables our model to be fit to input images without any 3D-to-2D projections.

Reflectance Field Model

We consider three different types of morphable reflectance field models. Each model can encompass approximately the entire range of possible reflectance fields across a population of objects. The preferred embodiment utilizes the third of the three types of models listed here.

The first type of morphable reflectance field model starts with the reflectance fields 103 obtained from any number of training images 102 of a number of objects from the object class, as described below. Then, the reflectance field of any input object from the class is approximated as a linear combination of these training reflectance fields. To make this model more efficient and potentially more reliable, a dimensionality reduction technique such as principle component analysis (PCA) can be used to reduce the dimensionality of the linear reflectance field model.

The second type of morphable reflectance field model similarly starts with the reflectance fields 103 obtained from the training images. Each of these training reflectance fields is first factorized into the product of an illumination field (defined below) and a texture image. This produces a set of training illumination fields and a set of training texture images. We then construct two linear models: one for illumination fields (in which any illumination field can be approximated as a linear combination of the training illumination fields) and one for texture images (in which any texture image is modeled as a linear combination of the training texture images). Either or both of these linear models can be dimensionality-reduced using PCA or some other dimensionality-reduction technique. The reflectance field of any object from the class is then approximated (from a given set of one or more images of the object) as the product of an illumination field and a texture image, each of which is estimated using the respective linear model.

The third type of morphable reflectance field model starts not only with reflectance fields obtained from a set of training images, but also with texture images obtained from a (possibly different) set of training images. Each of these reflectance fields is normalized by a corresponding texture image to obtain training illumination fields. From here on, the method works just like the second type of reflectance field model. We build separate linear models for illumination fields and texture images. The reflectance field of any object from the class is then approximated (from a given set of one or more images of the object) as the product of an illumination field (expressed using the linear illumination field model) and a texture image (expressed using the linear texture image model).

In the preferred embodiment that is described here in detail, we use this third type of morphable reflectance field model. One reason we do so is that it can be difficult to acquire large amounts of data from which a large number of training reflectance fields (and hence a large number of training illumination fields) can be obtained, but it is relatively easy to obtain large amounts of texture image data (a large number of training texture images). Thus, it is possible to obtain a rich morphable reflectance field model by using more training images (and more dimensions) for the linear texture model even when the number of training reflectance fields (and hence the number of training illumination fields) is severely limited.

Surprisingly, the separation of a given reflectance field into an illumination model and a texture is not well defined in the prior art. Most often, the definition of texture and of the illumination model are dependent on the assumed bidirectional reflectance distribution function (BRDF). For instance, in the Lambertian model, the albedo, which is a constant scaling factor at each pixel, is commonly accepted as the texture, while a cosine term is considered to be the illumination function (which is constant across the surface of the Lambertian object). The Lambertian reflectance function at a pixel is the product of the albedo and the illumination function.

We use the term illumination function to refer to the function at each pixel that takes illumination parameters (e.g., illumination direction) as input, and outputs a scalar brightness value. An illumination field is a field of such illumination functions, one for each pixel. We have chosen to use definitions of texture and of illumination model that are independent of any particular BRDF.

In our method, we factorize a reflectance field into a product of a texture image and an illumination field. The illumination field is defined as the quotient obtained by dividing the reflectance field by the texture image. In particular, the illumination function for each pixel is defined as the quotient function obtained when the pixel's reflectance function (over all lighting directions) is divided by the value of the texture image at that pixel (see Equation (1)).

We use the term normalizing the reflectance field to refer to the process of dividing the reflectance field by the texture image to obtain the illumination field. The texture image can be defined in a number of ways; we give two possibilities here. The first way is to define the texture image of any object from the object class as a frontally lit image of the object. The second way is to define an object's texture image as the image obtained by averaging the object's reflectance field over all illumination directions.

In the preferred embodiment, lighting conditions are defined as combinations of one or more point light sources at infinity. Thus, the relationship between an object's reflectance field, illumination field, and texture image is given by $$R(x,y,\theta,\phi) = L(x,y,\theta,\phi) \cdot T(x,y), \quad (1)$$

where $R(x, y, \theta, \phi)$ is the reflectance field, $L(x, y, \theta, \phi)$ is the illumination field, $T(x, y)$ is the texture image, $(x, y)$ is the pixel location, and $(\theta, \phi)$ is the illumination direction.

In the preferred embodiment, we define texture to be the frontally lit image (the first way of defining texture described above). We use that definition of texture largely for pragmatic reasons. To construct our model (as described below), we require a large collection of texture images, and it is fairly easy to obtain a large collection of images that are approximately frontally lit (e.g., frontally lit faces). One can also define the texture image of an object in some other way, such as the mean of the reflectance field over all illumination directions, though it may be difficult in practice to obtain a large set of reflectance fields over which this mean can be determined.

Figures 2A, 2B, 2C:
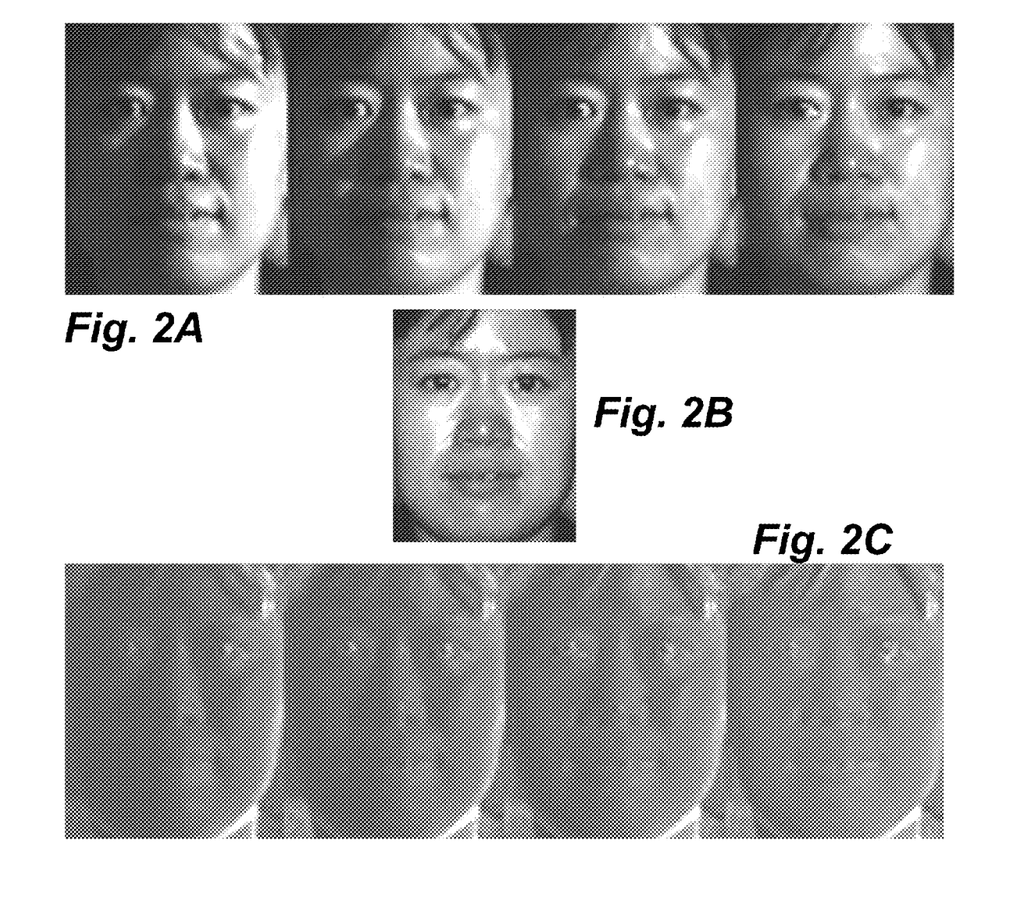
FIG. 2A are example two-dimensional (2D) slices of a four-dimensional (4D) reflectance field of an object, each corresponding to a different illumination, according to embodiments of the invention
FIG. 2B is an example texture image of the object according to embodiments of the invention.
FIG. 2C is an example of 2D slices of a 4D illumination field of an object, which was obtained by normalizing the illumination field illustrated in FIG. 2A by the texture image in FIG. 2B, according to embodiments of the invention.

FIGS. 2A-2C are images that illustrate the factorization of an example reflectance field as a product of a texture and an illumination field according to embodiments of the invention.

FIG. 2A is an example of two-dimensional (2D) slices of a four-dimensional (4D) reflectance field of an object, each corresponding to a different illumination, according to embodiments of the invention FIG. 2B is an example of texture image of the object according to embodiments of the invention;

FIG. 2C is an example of 2D slices of a 4D illumination field of an object, which was obtained by normalizing the illumination field illustrated in FIG. 2A by the texture image in FIG. 2B, according to embodiments of the invention.

Illumination Model

The first type of morphable reflectance field model described above requires a representation of the reflectance field (which includes a reflectance function at each pixel. The second and third types of morphable reflectance field model described above require a representation of the illumination field (which consists of an illumination function at each pixel). Each reflectance function, and likewise each illumination function, takes a lighting condition (e.g., a lighting direction) as input, and produces a scalar output (the brightness value for a pixel). We now describe three different ways to represent reflectance fields and illumination fields: using tensor splines, using spherical harmonics, or using what we call the direct light combination method.

We use tensor splines for modeling the illumination field in the preferred embodiment. Tensor splines and their role in the preferred embodiment are described in more detail below.

Illumination functions and reflectance functions can also be modeled using spherical harmonics. Spherical harmonics provide a way to approximate any spherical function as a linear combination of a small number of basis functions. In the prior art, spherical harmonics have been used for modeling illumination conditions.

However, we use the spherical harmonics for a different purpose: to model reflectance functions and illumination functions. The reflectance or illumination functions for all of the individual pixels are combined to form reflectance fields or illumination fields, respectively.

Modeling reflectance fields and illumination fields using spherical harmonics is effective when lighting conditions are modeled using individual point light sources, as in the preferred embodiment, or as linear combinations of individual point light sources. But it is even more efficient when the lighting conditions are themselves modeled using spherical harmonics, because then the representation of reflectance fields is precisely matched to the representation of lighting conditions.

A third way to represent reflectance functions or illumination functions is what we call a direct light combination method. In this case, we assume that any lighting condition is estimated as a linear combination of the light sources that were in the training images that we used to generate the training reflectance fields.

In this direct light combination method, a reflectance function or illumination function is not represented as a conventional smooth spherical function, but rather as a discrete set of brightness output values, one for each of the input lighting directions that were provided in the training images from which the training reflectance fields or training illumination fields were obtained.

This direct light combination method provides the closest possible match to the training data. If the number of training lighting directions is too high for a particular application, then a dimensionality reduction technique (such as PCA) can be used to reduce the dimensionality of the direct light combination model of the reflectance field and illumination field.

In the preferred embodiment, the training images used to determine the training reflectance fields are first warped into pixelwise correspondence. After we have constructed a morphable reflectance field model using the training reflectance fields, before fitting the morphable reflectance field model to any image or set of images, we also warp the image(s) into pixelwise correspondence using the same method (a 2D morphable model, described below).

In the preferred embodiment, we model each reflectance field and illumination field using $3^{rd}$-order tensor splines. In this framework, the reflectance function at pixel (x, y) is a spherical function that takes an illumination direction as input and outputs a scalar. The reflectance field is given by $$R(x, y, \theta, \phi) = \sum_{k+l+m=3} \gamma_{klm}(x, y) v_1^k v_2^l v_3^m \qquad (2)$$

where $\gamma_{klm}(x, y)$ are real-valued tensor coefficients, indices k, l, and m are nonnegative integers, and the illumination direction in Cartesian coordinates is given by $v_1=\sin(\theta)\cos(\phi)$, $v_2=\sin(\theta)\sin(\phi)$, and $v_3=\cos(\theta)$. This description of the reflectance function requires 10 tensor coefficients at each pixel (x, y), $$\Gamma(x,y) = \{\gamma_{klm}(x,y) | k+l+m=3\}.$$

We impose the further constraint that the reflectance functions vary smoothly over pixel locations. Following Kumar et al., a training object's reflectance field can be recovered from nine or more training images (images of the object under 9 or more lighting conditions). Since the smoothness constraint is imposed using a B-spline basis, we may use the term tensor spline to refer to our representation of the reflectance field.

These tensor coefficients (10 tensor coefficients for each pixel) describe the object's reflectance field. We scale the tensors down (normalize) by the object's texture image to obtain the tensor coefficients for the object's illumination field (which is approximately independent of texture). The tensor spline representation enables our illumination model to capture specularities and cast and attached shadows beyond the capabilities of the conventional Lambertian model.

The tensor splines framework provides a way to account for photo-effects caused by global shapes, such as cast shadows, without the need to fit a 3D shape model to the object.

Using nine or more training images of an object, the training reflectance field of the object can be obtained. In the preferred embodiment, the reflectance fields of the training images are learned once, offline, using a method that requires nine illumination images per object. We use the training reflectance fields of numerous objects from the object class to construct a morphable reflectance field model for the object class, as described above. After this reflectance field model is constructed, the invention does not require nine images in order to fit the model to any object from the class. In fact, our method only requires a single image of an object as input, though more can be used.

For efficiency in the preferred embodiment, we apply principal component analysis (PCA) to the training illumination fields, and we use linear combinations of the first few principal components and the mean of the training illumination fields to represent the illumination field of any object image in the gallery.

The $3^{rd}$-order tensor splines representation for an illumination field contains 10 coefficients per pixel. For the $j^{th}$ training illumination field, we concatenate all 10 coefficients at all of the M pixels into a single vector, $\mathcal{L}_j$, of length 10M. Applying PCA yields orthonormal bases $\hat{l}_i$ for the illumination model, and any illumination field can be approximated as $$\mathcal{L} = (\Sigma \alpha_i \hat{l}_i + \overline{\mathcal{L}}), \qquad (3)$$

where in this linear model, the scalar $\alpha_i$ is the coefficient of the $i^{th}$ illumination basis vector, and $\overline{\mathcal{L}}$ is the mean of the training illumination fields.

Texture Model

In the preferred embodiment, we define the texture of an object to be a frontally lit image of the object. To fit our model to any image, we model how the textures of objects can vary across a large population. To do this, we apply PCA to a set of training textures, all acquired under frontal illumination, which are first put into pixelwise correspondence.

Any texture image $\mathcal{T}$ can then be approximated as a linear combination of basis textures $\hat{t}_j$ that were obtained using PCA, plus a mean training texture $\overline{\mathcal{T}}$:

$$\mathcal{T} = (\Sigma \beta_j \hat{t}_j + \overline{\mathcal{T}}) \qquad (4)$$

where $\beta_j$ is the coefficient of the $j^{th}$ texture basis vector, and $\overline{\mathcal{T}}$ is the mean of the training textures.

Figure 3:
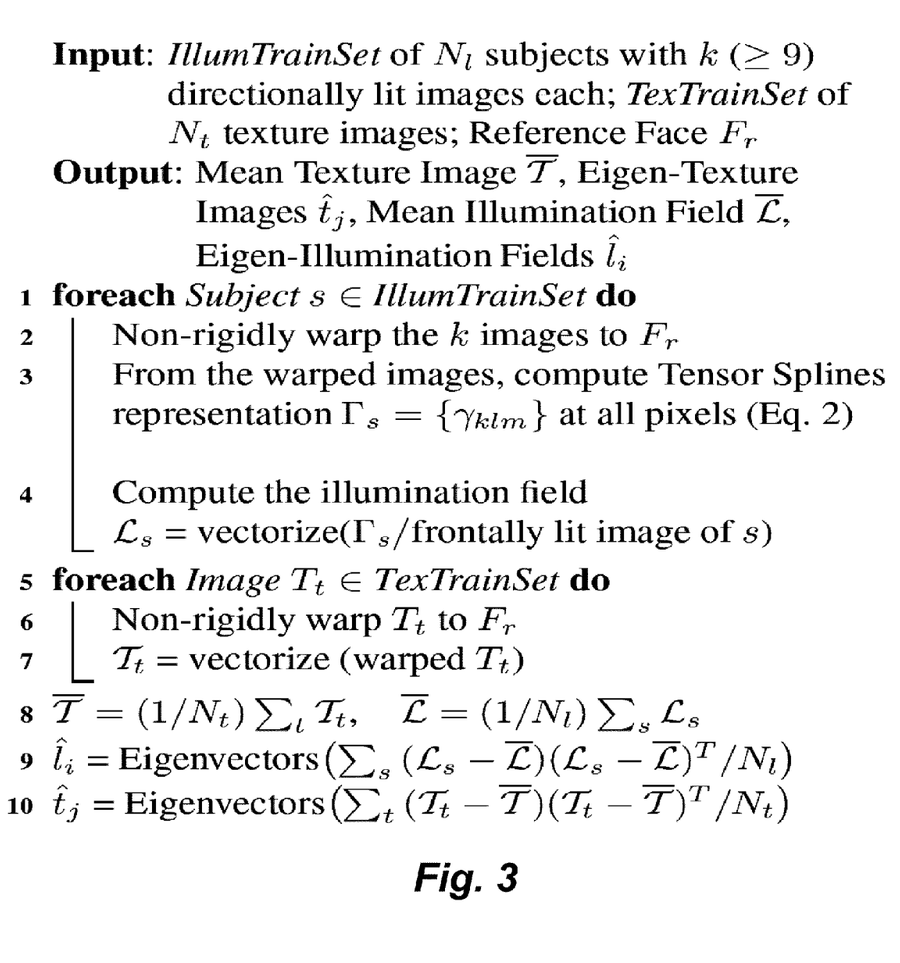
FIG. 3 is a block diagram of pseudo code of a process for defining a reflectance field model according to embodiments of the invention.

By eliminating the PCA components with the smallest eigenvalues, the number of terms in the texture and illumination models can be chosen according to computational and quality requirements. The set $\{\hat{t}_j, \overline{\mathcal{T}}, \hat{l}_i, \overline{\mathcal{L}}\}$ is our morphable reflectance field model 300.

FIG. 3 summarizes the pseudo code for the process for constructing the model 300.

Pixelwise Correspondence

In the preferred embodiment, all of the illumination fields and textures of our morphable reflectance field model are in pixelwise correspondence. This allows linear combinations of illumination fields and textures to yield more realistic illumination fields and textures. Our method can also be used with only approximate alignment as opposed to pixelwise correspondence, but the quality of the synthesized images will degrade. To achieve pixelwise correspondence, we use a 2D morphable model (2DMM). The 2DMM includes a reference image, a set of warp fields that represent the ways 2D shapes of objects can vary, and a set of texture images that represent the ways the shape-free appearances of objects can vary.

The 2DMM is fit to an input image using a nonlinear optimization that finds the optimal linear combination of textures, such that when warped by the optimal linear combination of shapes, the input image is reconstructed with minimal $L_2$ error. The warp field, $W=(W_x, W_y)$, that results from the optimal linear combination of shapes gives the pixelwise correspondences between the reference image of the 2DMM and the input image. $W_x(x, y)$ takes a pixel in the reference image and outputs the corresponding x position in the input image. $W_y(x, y)$ outputs the corresponding y position in the input image.

Before fitting the 2DMM to an input image, the image is cropped and rectified by running an object detector and feature detectors to find at least two feature points. These feature points are then used to determine a similarity transform that aligns the object to a canonical scale, rotation and position. All illumination fields and textures are cropped and rectified in this manner, resulting in an initial rough alignment.

The 2DMM was also used to find pixelwise correspondences between the 2DMM reference image and each of the training images used to compute the training reflectance fields. Thus, the illumination field eigenvectors are all in correspondence because all of the training images were put into correspondence. Similarly, all of the training texture images were also warped into pixelwise correspondence with the 2DMM reference image to yield texture eigenvectors that are all in correspondence.

Model Fitting

Given K images $I_k$ of an object from the object class ($1 \leq k \leq K$) under unknown illumination conditions (in the preferred embodiment, each unknown illumination condition is a point light source in an unknown direction), the problem now is to fit our illumination field model to the input image(s). The unknowns include the non-rigid deformation W to align the input image to the model, the illumination direction in each of the K images, the texture model coefficients, and the illumination field model coefficients.

We recover these unknown parameters by minimizing the following objective function:

$$E_1(W_x, W_y, \alpha_i, \beta_j, \theta_k, \phi_k) = \sum_k \sum_{(x,y)} \left\| D\left(\left(\sum_{i=1}^n \alpha_i \hat{l}_i + \mathcal{L}\right)(x, y), \left(\sum_{j=1}^m \beta_j \hat{t}_j + \mathcal{T}\right)(x, y), \theta_k, \phi_k\right) - I_k(W_x(x, y), W_y(x, y)) \right\|^2,$$ (5)

where $W_x$ and $W_y$ are the x and y components of the non-rigid deformation that gives correspondences from the reference image to the input images, $(\theta_k, \phi_k)$ is the illumination direction of the $k^{th}$ input image, $\alpha_i$ are the illumination coefficients, and $\beta_j$ are the texture coefficients. The function D takes the 10 tensor coefficients of the estimated illumination function at (x, y), the estimated scalar texture value at (x, y), and the illumination direction $(\theta_k, \phi_k)$, and determines the brightness at each pixel using the tensor splines basis:

$$D(\mathcal{L}(x,y), \mathcal{T}(x,y), \theta, \phi) = \mathcal{T}(x,y) \cdot [\mathcal{L}(x,y)^T S(\theta, \phi)],$$ (6)

where S is the vector of 10 tensor spline basis functions, defined as $$S(\theta, \phi) = [v_1^3 v_2^3 v_3^3 v_1^2 v_2 v_1^2 v_3 v_1 v_2^2 v_1 v_3^2 v_1 v_2 v_3 v_2^2 v_3 v_2 v_3^2]^T,$$ (7)

where $(v_1, v_2, v_3)$ are the Cartesian coordinates of the illumination direction.

In addition to the objective function defined above, we constrain the search space for the illumination model further by adding the following Tikhonov regularizer to Equation (5)

$$E_2(\alpha_i) = \lambda \cdot \sum_i^n \alpha_i^2,$$ (8)

where $\lambda$ is the regularization parameter. Tikhonov regularization, also known as ridge regression, is commonly used method of regularization of ill-posed problems. This constraint prevents the estimated illumination field from straying too far from the model derived from the training illumination fields, and the constraint results in artifact-free relighted synthetic images.

The process for recovering the unknowns is performed in four steps.

In the first step, the input images are aligned with the illumination model. In the preferred embodiment, we assume that at least one input image of each object is roughly frontally lit (to ensure good performance of the 2DMM). Only one input image of each object is required. However, if more than one input image of an object is provided, we assume a pixel-wise alignment amongst the images. We use the automatic object detector and the 2DMM described above to determine the non-rigid deformation parameters from the input image that has roughly frontal illumination. The outputs of this step are the deformation parameters $W_x$ and $W_y$, which are used to warp the input image(s) into pixelwise correspondence with the eigen-illumination fields and eigen-textures of our morphable reflectance field model.

In the second step, we determine the remaining unknowns by minimizing $$E(\alpha_i, \beta_j, \theta_k, \phi_k) = E_1(W_x, W_y, \alpha_i, \beta_j, \theta_k, \phi_k) + E_2(\alpha_i)$$ (9)

using a nonlinear optimization procedure.

After the unknowns have been recovered, we have an estimate of the reflectance field of the input image, but it is still warped to be in pixelwise alignment with the reference image.

In the third step of our model-fitting process, we warp the estimated reflectance field using the deformation parameters determined earlier to put the reflectance field in pixelwise correspondence with the input images. Because the entire process involves two registration steps (warps), the resulting reflectance field provides images that appear grainy.

To remove these interpolation artifacts, we have incorporated a final step in the fitting process that we call quotient mapping. We generate a synthesized image from the estimated reflectance field using the same illumination direction as the roughly-frontally-lit input image. The illumination direction for this image was determined as part of the optimization procedure described above. Next, we determine the quotient map by dividing the near-frontally lit image by its synthesized estimate. The quotient map is used to scale the entire estimated reflectance field, which suppresses the artifacts introduced by interpolation and extrapolation during the warps of the reflectance field.

Figure 4:
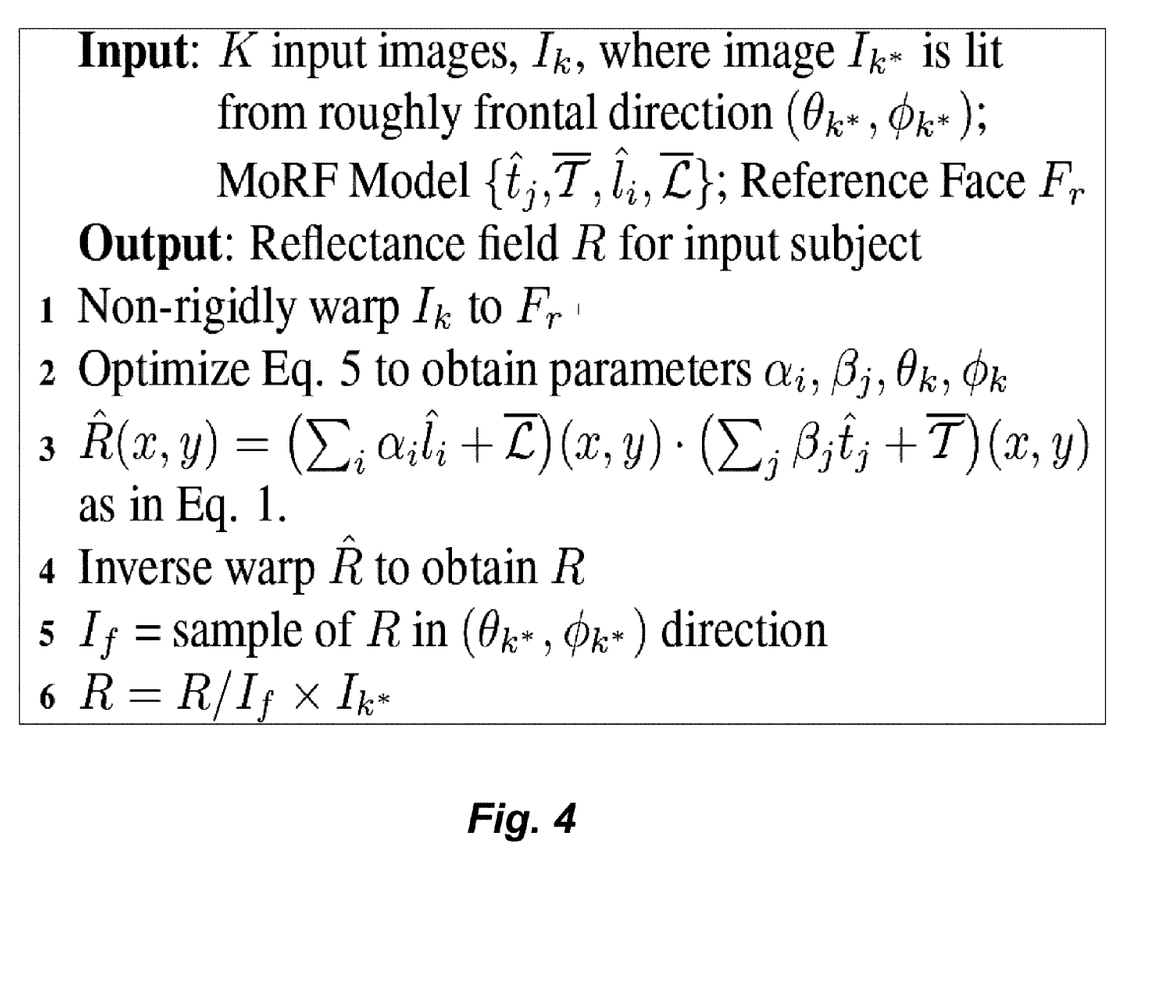
FIG. 4 is a block diagram of pseudo code of a process for fitting the reflectance field model to input images in a gallery according to embodiments of the invention.

The pseudo-code for the process for fitting the model as described above is summarized in FIG. 4.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for synthesizing a new image of an object from an object class, wherein the object class is known, comprising the steps of:
   obtaining reflectance fields for training objects from the object class;
   constructing a reflectance field model for the object class using a combination of the reflectance fields of the training objects, wherein the constructed reflectance field model is defined as a mean of the reflectance fields of the training objects plus a linear combination of principal components of the reflectance fields of the training objects;
   fitting the reflectance field model to a particular object from the object class by optimizing parameters of the reflectance field model to estimate a particular reflectance field given one or more input images of the particular object; and
   synthesizing the new image of the particular object by changing illumination inputs of the particular reflectance field.

2. The method of claim 1, wherein the constructed reflectance field model is further defined as a product of a linear illumination field model and a separate linear texture model.

3. The method of claim 2, wherein the illumination field model is defined as a linear combination of illumination fields of the training objects.

4. The method of claim 2, wherein the illumination field model is defined as a mean of the illumination fields of the training objects plus a linear combination of principal components of the illumination fields of the training objects.

5. The method of claim 2, wherein the texture model is defined as a linear combination of a set of texture images.

6. The method of claim 2, wherein the texture model is defined as a mean of a set of texture images plus a linear combination of principal components of the set of texture images.

7. The method of claim 5, wherein the set of texture images is derived from the reflectance fields of the training objects.

8. The method of claim 6, wherein the set of texture images is derived from the reflectance fields of the training objects.

9. The method of claim 5, wherein each texture image is obtained from a frontally lit image of an object from the object class.

10. The method of claim 6, wherein each texture image is obtained from a frontally lit image of an object from the object class.

11. The method of claim 7, wherein each texture image is obtained from the reflectance field of a training object by averaging the reflectance field over all illumination directions.

12. The method of claim 8, wherein each texture image is obtained from the reflectance field of a training object by averaging the reflectance field over all illumination directions.

13. The method of claim 1, wherein the reflectance fields are represented by tensor splines.

14. The method of claim 1, wherein reflectance functions of the reflectance fields are represented by spherical harmonics.

15. The method of claim 1, wherein reflectance functions of the reflectance fields are represented using a direct light combination method.

16. The method of claim 3, wherein the illumination fields are represented by tensor splines.

17. The method of claim 4, wherein the illumination fields are represented by tensor splines.

18. The method of claim 3, wherein illumination functions of the illumination fields are represented by spherical harmonics.

19. The method of claim 4, wherein illumination functions of the illumination fields are represented by spherical harmonics.

20. The method of claim 3, wherein illumination functions of the illumination fields are represented by a direct light combination method.

21. The method of claim 4, wherein illumination functions of the illumination fields are represented by a direct light combination method.

22. The method of claim 1 wherein the synthesizing further comprises:
applying quotient mapping to the new image.

23. The method of claim 1, further comprising:
repeating the synthesizing with different illumination inputs to generate multiple new images; and
storing the new images along with the one or more input images to form an augmented gallery.

24. The method of claim 23, wherein the augmented gallery is used for recognizing objects within the object class.

25. The method of claim 1, further comprising:
repeating the fitting and synthesizing for more than one particular object from the object class.

26. The method of claim 1, wherein the object class is faces.

27. The method of claim 1, wherein at least one of the input images of the particular object is lit from a roughly frontal direction.

28. The method of claim 1, wherein all of the input images of the particular object are pixelwise aligned with each other.

* * * * *